United States Patent
Kohara (10) Patent No.: US 10,500,803 B2
(45) Date of Patent: Dec. 10, 2019

(54) RIGID INNER MOLD FOR FORMING TIRE, AND METHOD OF MANUFACTURING TIRE USING THE SAME

(71) Applicant: SUMITOMO RUBBER INDUSTRIES, LTD., Kobe-shi (JP)

(72) Inventor: Kei Kohara, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 312 days.

(21) Appl. No.: 15/119,808

(22) PCT Filed: Mar. 3, 2015

(86) PCT No.: PCT/JP2015/056150
§ 371 (c)(1),
(2) Date: Aug. 18, 2016

(87) PCT Pub. No.: WO2015/133451
PCT Pub. Date: Sep. 11, 2015

(65) Prior Publication Data
US 2017/0057187 A1 Mar. 2, 2017

(30) Foreign Application Priority Data

Mar. 7, 2014 (JP) .................................. 2014-045397

(51) Int. Cl.
*B29D 30/12* (2006.01)
*B29C 33/56* (2006.01)
(Continued)

(52) U.S. Cl.
CPC .......... *B29D 30/0661* (2013.01); *B29C 33/56* (2013.01); *B29D 30/12* (2013.01); *B29C 33/62* (2013.01)

(58) Field of Classification Search
CPC .... B29D 30/10; B29D 30/12; B29D 30/0661; B29C 33/56; B29C 33/565; B29C 33/58;
(Continued)

(56) References Cited

U.S. PATENT DOCUMENTS

2005/0247393 A1\* 11/2005 Misani ................ B29C 35/0266
156/123
2007/0235890 A1 10/2007 Price Lewis et al.
(Continued)

FOREIGN PATENT DOCUMENTS

DE 11 2011 101 741 T5 4/2013
DE 10 2011 055 673 A1 5/2013
(Continued)

OTHER PUBLICATIONS

Extended European Search Report dated Oct. 11, 2017 in Patent Application No. 15759299.9.
(Continued)

*Primary Examiner* — Geoffrey L Knable
(74) *Attorney, Agent, or Firm* — Oblon, McClelland, Maier & Neustadt, L.L.P.

(57) ABSTRACT

In an inner mold method, a pull-out force of extracting inner mold segments from a vulcanized tire is reduced. A rigid inner mold 1 is provided with an annular inner mold body 2 having a tire molding surface S. A rigid core 1 is put into a vulcanization mold B for each green tire T formed on the tire molding surface S, whereby the green tire T is vulcanization-molded between the vulcanization mold B and the inner mold body 2. The inner mold body 2 comprises a plurality of inner mold segments 5 divided in the circumferential direction. A coating layer 11 having rubber release property is formed on the tire molding surface S.

20 Claims, 6 Drawing Sheets

(51) Int. Cl.
  *B29D 30/06* (2006.01)
  *B29C 33/62* (2006.01)
(58) Field of Classification Search
  CPC ......... B29C 33/60; B29C 33/62; B29C 33/64; B29C 33/66; B29C 33/68
  See application file for complete search history.

(56) References Cited

U.S. PATENT DOCUMENTS

| | | |
|---|---|---|
| 2013/0001828 A1 | 1/2013 | Sano et al. |
| 2013/0248085 A1 | 9/2013 | Sugimoto |
| 2015/0151459 A1 | 6/2015 | Price Lewis et al. |
| 2015/0210026 A1* | 7/2015 | Sakamoto ............... B29D 30/12 264/319 |

FOREIGN PATENT DOCUMENTS

| | | | | |
|---|---|---|---|---|
| JP | 2-245323 A | | | 10/1990 |
| JP | 07-034296 A | * | | 2/1995 |
| JP | 7-34296 A | | | 2/1995 |
| JP | 2005-238467 A | | | 9/2005 |
| JP | 2009-248484 A | | | 10/2009 |
| JP | 2011-161896 A | | | 8/2011 |
| JP | 2011-167979 A | | | 9/2011 |
| JP | 2012-115841 A | * | | 6/2012 |
| JP | 2013-146905 A | | | 8/2013 |
| WO | WO 03/101711 A1 | | | 12/2003 |
| WO | 2012/077373 A1 | | | 6/2012 |
| WO | WO-2014/050363 A1 | * | | 4/2014 |

OTHER PUBLICATIONS

International Search Report dated Jun. 2, 2015 in PCT/JP2015/056150 filed Mar. 3, 2015.

* cited by examiner

RIGID INNER MOLD FOR FORMING TIRE, AND METHOD OF MANUFACTURING TIRE USING THE SAME

TECHNICAL FIELD

The present inventions relate to a rigid inner mold for forming a tire and a method of manufacturing the tire using it which is, in an inner mold method, capable of reducing a force to pull out inner mold segments from a vulcanized tire thereby accelerating disassembly extraction operations of the inner mold body.

BACKGROUND ART

In recent years, in order to improve formation accuracy of forming a tire, a method of manufacturing a tire using a rigid inner mold (hereinafter it may be referred to as "inner mold method") has been proposed (e.g. see Patent Documents 1 and 2.) The rigid inner mold comprises an inner mold body having an outer shape suiting a shape of a tire cavity surface of a vulcanized tire. Onto the inner mold body, tire structure members are sequentially attached so as to form a green tire. The green tire with the rigid inner mold is put into a vulcanizing metallic mold, and the green tire is vulcanized and molded.

Figure 7A:
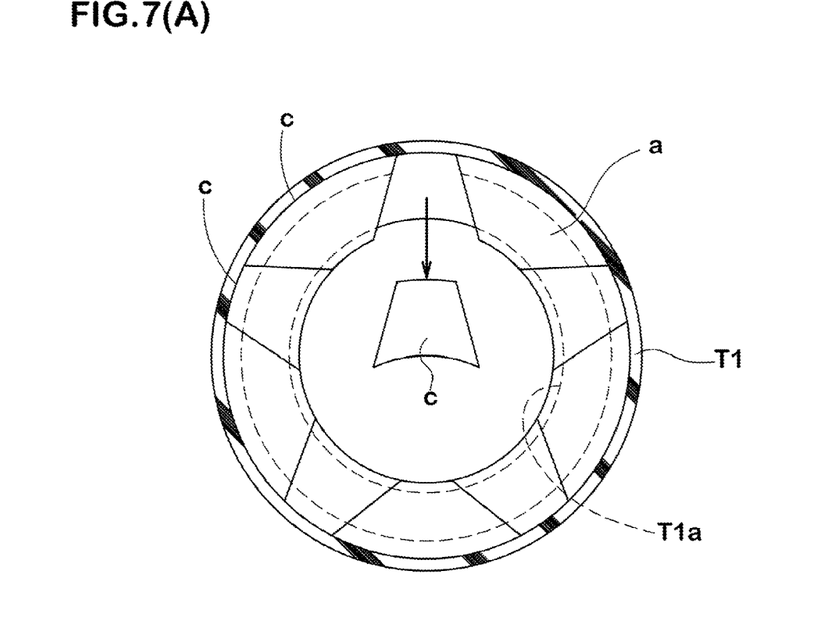
Figure 7B:
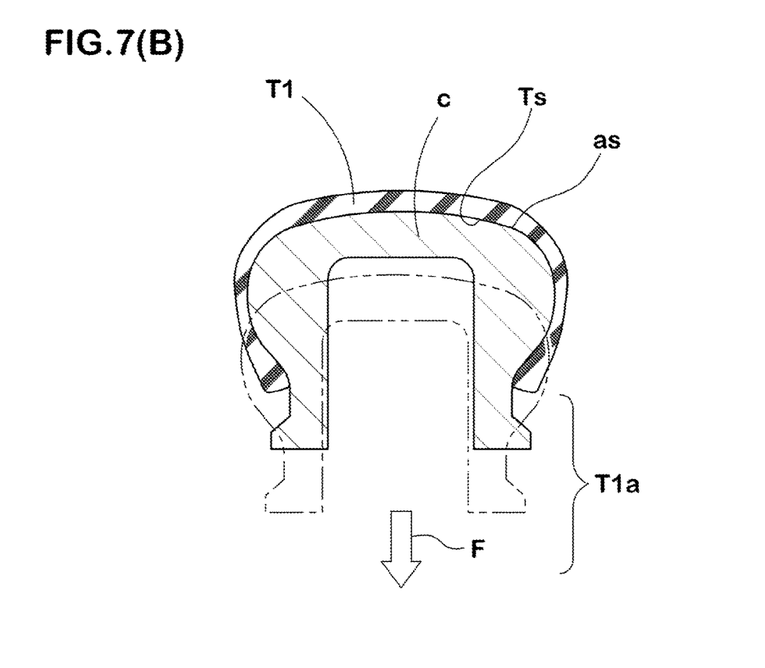

As shown in FIGS. 7(A) and 7(B), in the inner mold method, to take out an inner mold body (a) from a vulcanized tire T1, the rigid inner mold body (a) is divided into a plurality of inner mold segments (c) in the circumferential direction. The inner mold segments (c) are pulled out inward one by one and taken out from a bead hole T1$a$ of the tire T1.

However, an inner surface Ts of the vulcanized tire T1 is attached closely to a tire molding surface (as), which is an outer surface of the inner mold body (a). Therefore, it takes a large force F to extract the inner mold segments (c). In the case of forcible extraction, there are risks of damage and deformation in the tire T1 and loss of tire quality. Thus, conventionally it is performed to the increase the division number of the inner mold segments (c), so as to reduce the extracting force F per innermold segment (c) or to pull slowly. However, in this case, it takes a longer time for disassembly extraction operations and incurs reduction in quality.

RELATED ART

Patent Literature

Patent Document 1: Japanese unexamined Patent Publication No. 2011-161896

Patent Document 2: Japanese Unexamined Patent Publication No. 2011-167979

SUMMARY OF THE INVENTION

Problems that the Invention is to Solve

In the present invention, it is an object of the present invention to provide a rigid inner mold for forming tire and a method of manufacturing tire using it which is capable of rapidly destructing and taking off a rigid innermold from a vulcanized tire thereby improving productive efficiency.

Means for Solving the Problem

According to the present invention, a rigid inner mold comprises an annular inner mold body having a tire molding surface for forming a green tire, and is put into a vulcanizing metallic mold with the green tire so as to vulcanize the green tire between the vulcanizing metallic mold and the inner mold body. The inner mold body comprises a plurality of inner mold segments divided in the circumferential direction. And on the tire molding surface, a coating layer having rubber release property is provided.

Effect of the Invention

As mentioned above, in the present invention, a coating layer having a rubber release property is formed on a tire forming surface of the inner mold body. Therefore, it is possible to reduce the pull-out force of the inner mold segments from the tire after vulcanization. Thus, it is possible to accelerate the disassembly extraction operations of the inner mold body from the tire without causing any damage and deformation to the tire, thereby improving the production efficiency of the tire.

BRIEF DESCRIPTION OF THE DRAWINGS

FIGS. 6 (A) and (B) are conceptual diagrams for explaining an evaluation test for evaluating rubber release property of a coating layer.

FIGS. 7 (A) and (B) are a side view and a cross-sectional view for explaining problems of a conventional inner mold body.

DESCRIPTION OF THE INVENTION

Hereinafter, an embodiment of the present invention will be described in detail.

Figure 1:
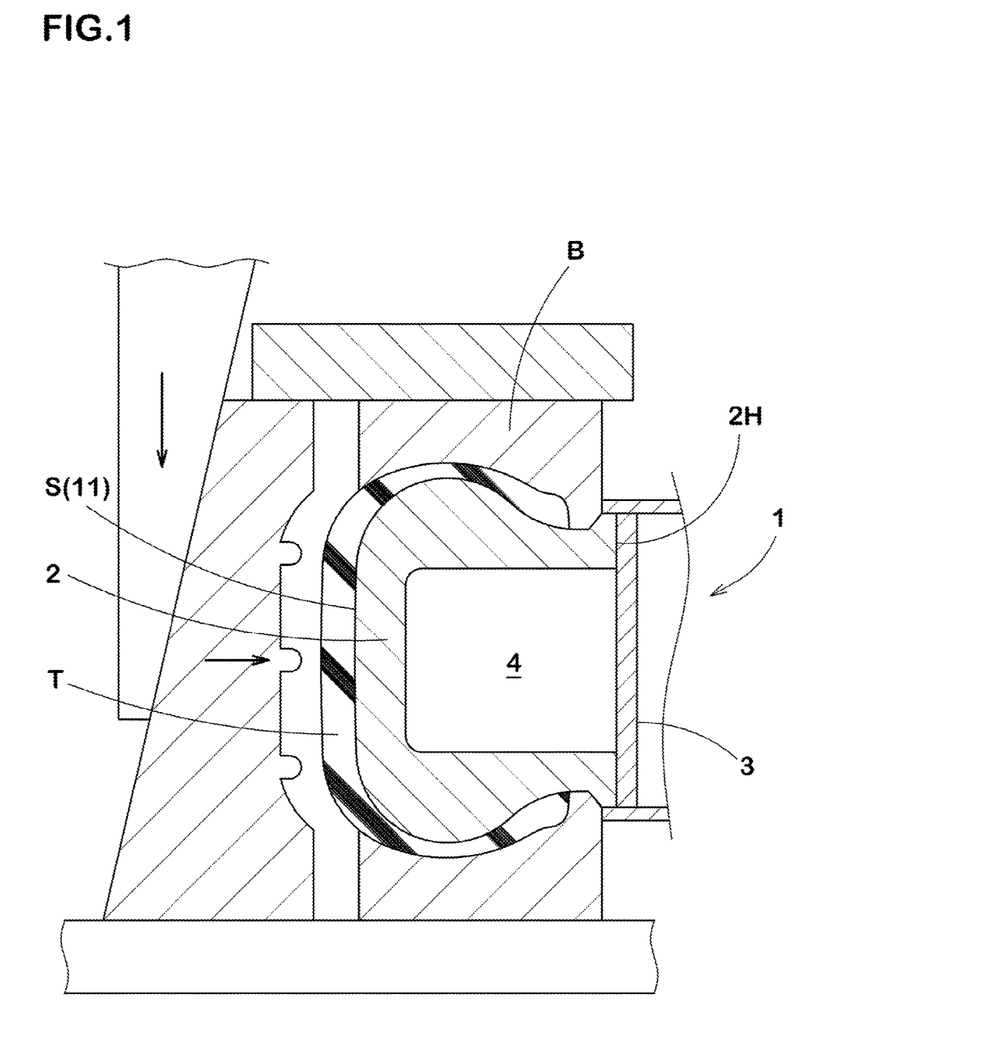
FIG. 1 is a cross-sectional view showing a vulcanization step in a tire manufacturing method of the present invention.

As shown in FIG. 1, a rigid inner mold 1 for forming a tire according to the present invention comprises an annular inner mold body 2 provided on an outer surface with a tire molding surface S. On this tire molding surface s, tire structure members such as a carcass ply, a belt ply, a sidewall rubber, a tread rubber are attached sequentially, thereby forming a green tire T having substantially the same shape as a finished tire. In addition, the green tire T with the rigid inner mold 1 is pit into a vulcanizing metallic mold B, thereby vulcanizing the green tire T between the inner mold body 2 as an inner mold and the vulcanizing metallic mold B as an outer mold. The tire molding surface s is formed in substantially the same shape as an inner surface shape of the finished tire.

The rigid inner mold 1 comprises the inner mold 2 and a cylindrical core 3 which is inserted into a center hole 2H of the inner mold 2. Except for the inner mold body 2, conventional well-known structures can be employed. Therefore, in this specification, it will be described only the inner mold body 2 below.

The inner mold body 2 has a hollow shape comprising a cavity portion 4 extending continuously in the circumferential direction, for example. Inside the cavity portion 4, a heating means (not shown) such as an electric heater to heat inward the green tire T is disposed.

Figure 2:
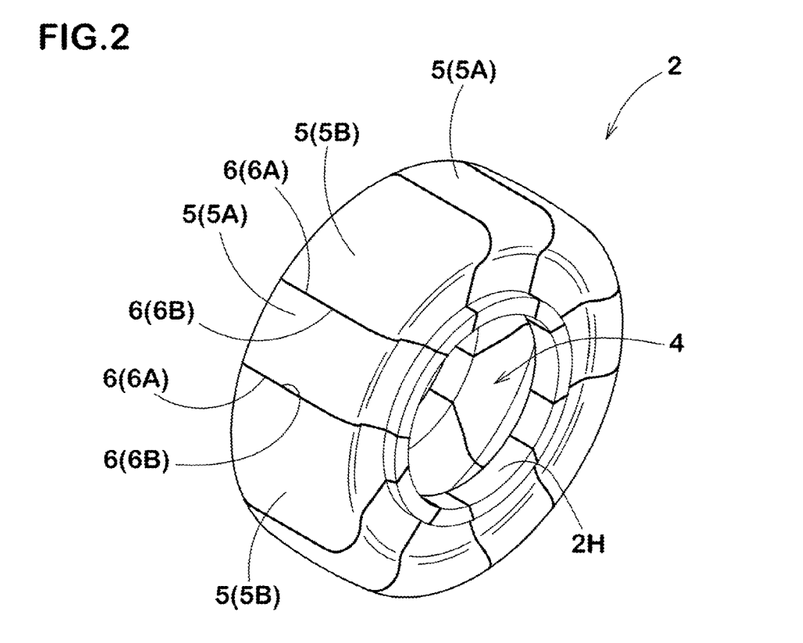
FIG. 2 is a perspective view showing an inner mold body.

As shown in FIG. 2, the inner mold body 2 is formed of a plurality of inner mold segments 5 which are divided in the circumferential direction. Each of the inner mold segments 5 has mating surfaces at both ends in its circumferential direction. The mating surfaces 6 and 6 which lie next to each other are arranged in a head-to-head, thereby forming the inner mold body 2 circularly.

Figure 3:
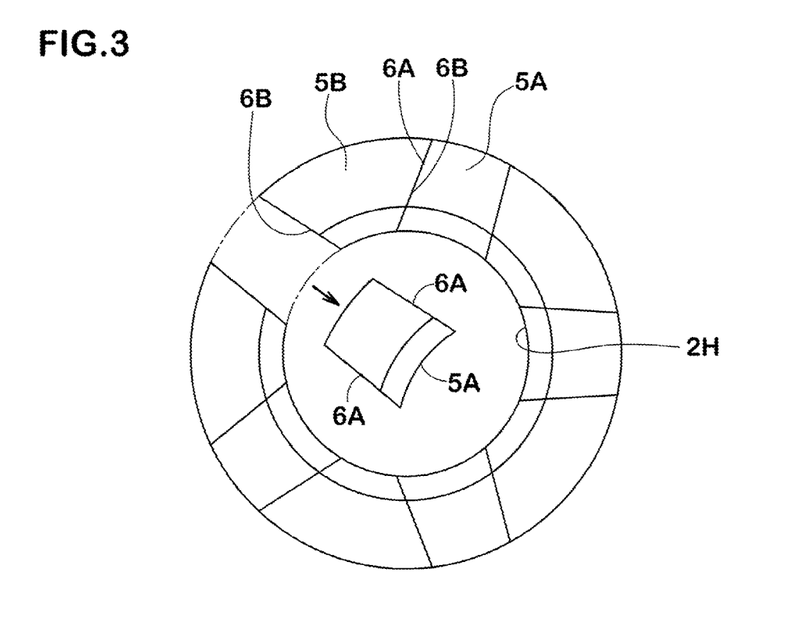
FIG. 3 is a side view of the inner mold body.

In the present embodiment, the inner mold segment 5 is formed of inner mold segments 5A and second inner mold segments 5B which are arranged alternately in the circumferential direction. In each of the first inner mold segments 5A, each of the mating surfaces 6A in its circumferentially both ends is inclined in a direction of a circumferential width increasing radially inward. However, in each of the second inner mold segments 5B, each of the mating surfaces 6B in its circumferentially both ends is inclined in a direction of a circumferential width decreasing radially inward. Thus as shown in FIG. 3, starting with the first inner mold segments 5A, they are sequentially moved radially inward. After vulcanization, they are taken out from a bead hole of the vulcanized tire. Note that the core 3 has a function to prevent the movement of each of the inner mold segments 5 radially inward so as to integrally connect the inner mold segments 5.

Figure 4:
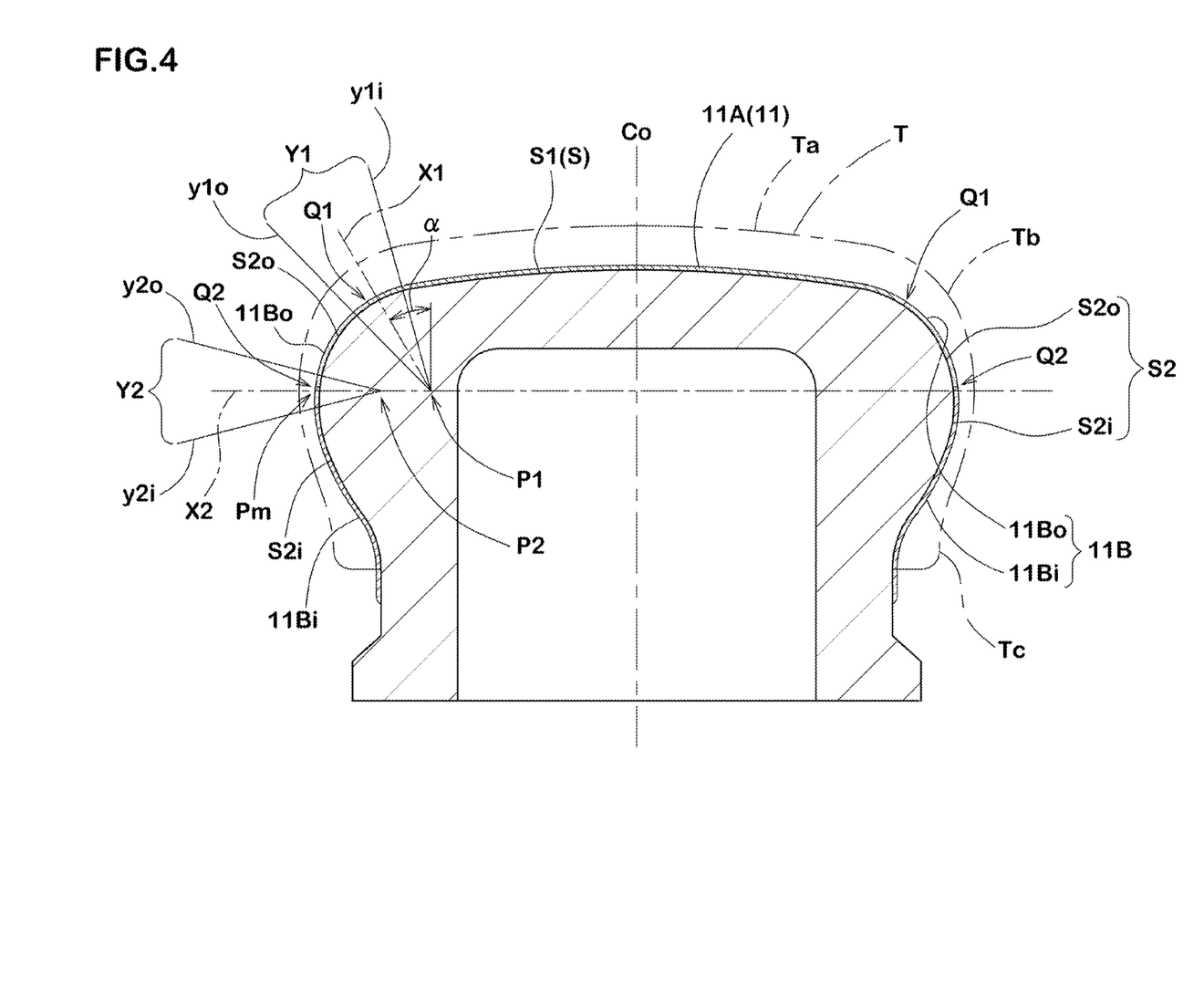
FIG. 4 is a cross-sectional view illustrating a tire forming surface.
Figure 5:
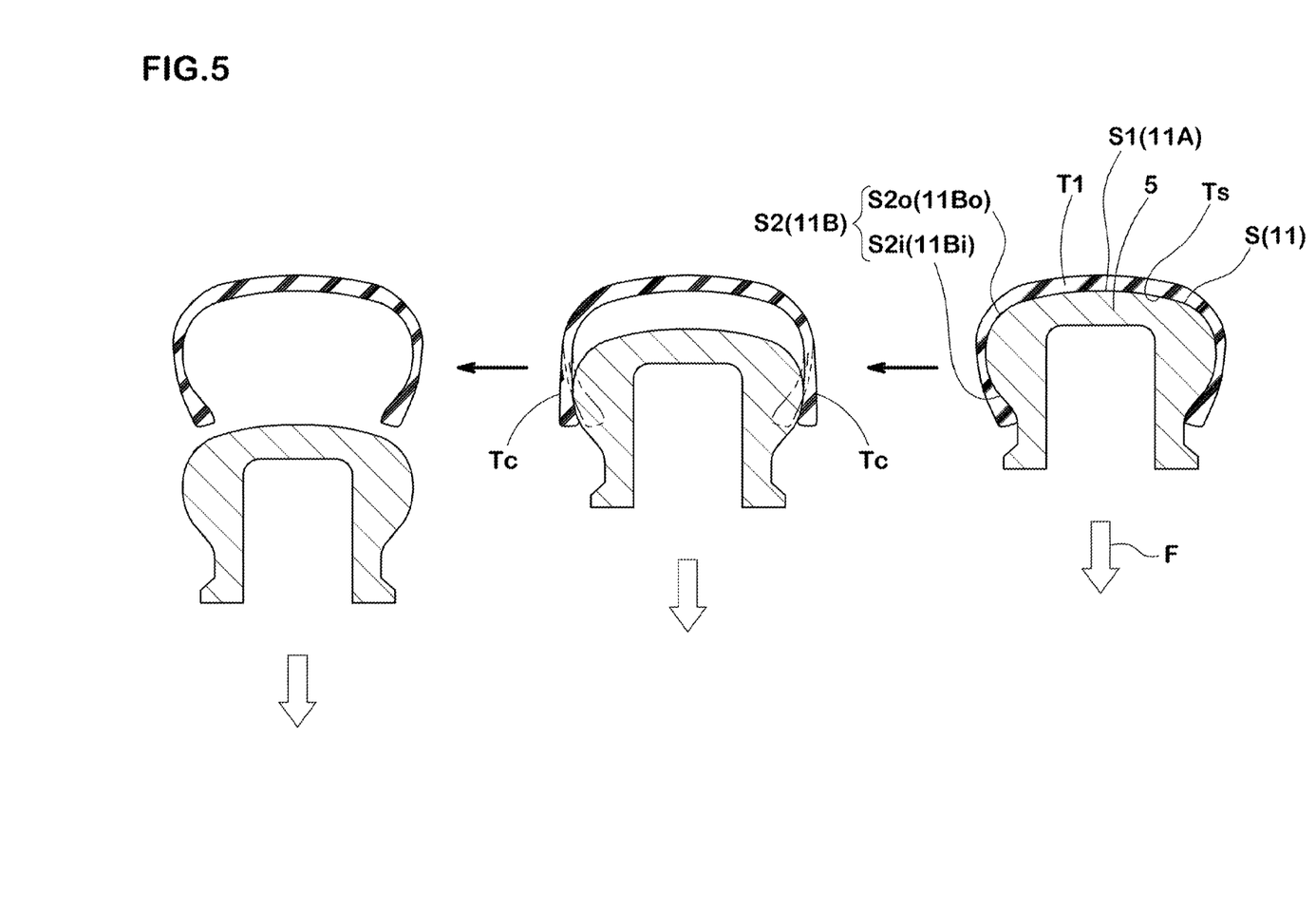
FIG. 5 is a conceptual diagram explaining how to take out of the inner mold segment from the vulcanized tire.

In the present invention, as shown in FIG. 4, the tire molding surface s is provided with a coating layer 11 having the rubber release property. Thus as shown in FIG. 5, when by pulling out the inner mold segments 5 radially inward from the vulcanized tire T1, the releasability from the inner surface Ts of the vulcanized tire T1 of the tire forming surface S can be improved, and the pull-out force F of the inner mold segment 5 can be reduce. Therefore, without causing scratches and deformation in the tire, it is possible to rapidly perform the disassembly extraction operations of the inner mold body 2 from the tire, thereby improving the production efficiency of the tire.

For the coating layer 11, an organic material such as a fluorine-based resin and a siloxane-based resin having an excellent rubber mold-release property may be employed. However, from the viewpoints of wear resistance, hardness, and rubber release property, a combination of the above-mentioned organic material with an inorganic material such as metal, ceramic, and combination conversion coating film can be suitably employed. As such, for instance, the trade name "Bicoat" (manufactured by YOSHIDA SKT CO., LTD.) is taken. This Bicoat is formed as a composite film which is obtained by dispersive mixing of the organic material such as fluorine-based resin, siloxane-based resin and the like in a nickel-based metal film, a chromium-based metal film, an alumina film, a conversion coating a metal, or ceramic spraying film. Specifically, there are NYK series obtained by combining the nickel-based metal film with the fluorine-based resin, NOO series obtained by combining the chromium-based metal film with the fluorine-based resin, TYS series obtained by fusing the fluorine-based resin into the chemical film reacted with iron ions in the metal substrate, NYN series obtained by combining the alumina film with the fluorine-based resin, and CTT series obtained by combining the metal film with the siloxane-based resin.

Other than this, for instance, the trade name "NEDOX" (manufactured by ULVAC TECHNO, Ltd.) formed as a composite film which is obtained by impregnating microscopic pores of a nickel alloy layer with the fluorine-based resin thereby integrating strongly, and the trade name "KANIFLON" (manufactured by Japan Kanigen Co., Ltd.) formed as a composite film which is obtained by dispersing-eutectoid the nickel film evenly with fine particles of the fluorine resin are taken.

Also the coating layer 11 preferably includes a plurality of coating layer portions having different hardness.

More specifically, as shown in FIG. 4, the tire forming surface S comprises a tread molding surface portion S1 to mold the inner surface of the tread portion Ta of the tire T, and side molding surface portions S2 and S2 disposed on both sides thereof. Each of the side molding surface portions S2 molds inner surfaces of a sidewall portion Tb and a bead portion Tc of the tire T. The coating layer 11 according to the present embodiment comprises a tread coating layer portion 11A formed in the tread molding surface portion S1 and a side coating layer portion 11B formed in the side molding surface portion S2.

A boundary Q1 between the tread molding surface portion S1 and the side molding surface portion S2 is positioned in a shoulder region Y1 defined below. For more information, among normal lines perpendicular to the tire molding surface S, the normal line having an angle α of 30 degrees with respect to the radial direction is defined as a reference line X1. Further, an intersection between the reference line X1 and a tire axial direction line X2 passing through the maximum width point Pm where the tire forming surface S most protrudes outward in the tire axial direction is defined as a reference point P1. Then the above-mentioned shoulder region Y1 is defined as a region between an inner boundary line y1i inclined axially inward at an angle of 15 degrees with respect to the reference line X1 among straight lines passing through the reference point P1 and an outer boundary line y1o inclined axially outward at an angle of 15 degrees.

Also the side molding surface portion S2 of the present embodiment is divided into an outer side surface portion S2o disposed radially outward and an inner side surface portion S2i disposed radially inward. A boundary Q2 between the outer side surface portion S2o and the inner side surface portion S2i is located in the side area Y2 as herein defined. For details, an axial line passing through the maximum width point Pm is defined as a reference line X2, and a curvature radius center point of the side molding surface portion S2 at the maximum width point Pm is defined as P2. Then the side region Y2 is defined as a region between an inner boundary line y2i inclined radially inward at an angle of 15 degrees with respect to the reference line X2 among straight lines passing through the curvature radius center point P2, and an outer boundary line y2o inclined radially outward at an angle of 15 degrees.

As shown in FIG. 5, when destructing to take out the inner mold segments 5 from the vulcanized tire T1, the inner mold segments 5 are radially inward pulled out while pushing axially onward the bead portion Tc of the vulcanized tire T1. Therefore during the extraction, the side coating layer portion 11B is subjected to friction with the bead portion Tc strongly, and abrasion and peeling are likely to occur in the coating film. Accordingly, the side coating layer portion 11B preferably includes a coating layer portion which is harder than that of the tread coating layer portion 11A.

In particular, the friction with the bead portion Tc in the inner side surface portion S2i is stronger in comparison with the outside side surface portion S2o. Therefore, it is preferable that in the side coating layer portion 11B, an inner side coating layer portion 11Bi formed in the inner side surface portion S2i is set to be harder than a hardness of an outer side coating layer portion 11Bo formed in the outer side surface portion S2o.

On the other hand, with respect to the radial direction line, the side molding surface portion S2 forms more steeply compared to the tread molding surface portion S1. Therefore, during the formation of the green tire T by adhering unvulcanized tire structure members to the tire molding surface S, tire forming members are harder to adhere to the side molding surface S2 than the tread molding surface S1, and the tire forming members shift more easily from the side molding surface S2 than the tread molding surface S1. Therefore, for the forming the green tire T, the side coating layer portion 11B formed in the side molding surface portion S2 among the coating layers 11 is preferably set to have a rubber release property smaller than the tread coating layer portion 11A formed in the tread molding surface portion S1. Thus, it is possible to maintain formation efficiency of the green tire T.

That is, in this embodiment, the coating layer 11 is divided into a tread coating layer portion 11A disposed in the tread molding surface portion S1 and a side coating layer portion 11B disposed to the side molding surface portion S2. The side coating layer portion 11B is divided into the inner side coating layer portions 11Bi disposed on the inner side surface portion S2$i$ and the outer side coating layer portion 11Bo disposed on the outer side surface portion S2$o$.

Then the tread coating layer portion 11A is set to have the rubber release property larger than the rubber release property of the side coating layer portion 11B. Also in the side coating layer portion 11B, the hardness of the inner side coating layer portions 11Bi is set to be larger than the hardness of the outer side coating layer portion 11Bo. It should be noted that in general, a coating film having a larger hardness tends to be inferior in the rubber release property to a coating film having a smaller hardness. Thus, in this embodiment, the rubber release property of the inner side a coating layer portion 11Bi is smaller than the outer side coating layer portion 11Bo. This is also preferable for adhering and keeping an unvulcanized tire forming members on the inner side surface portion S2$i$ when forming the green tire.

Note that the hardness of the coating layer is measured and compared in accordance with JIS Z2244, "Micro Vickers hardness test" described in "Vickers hardness test—Test method".

Figure 6A:
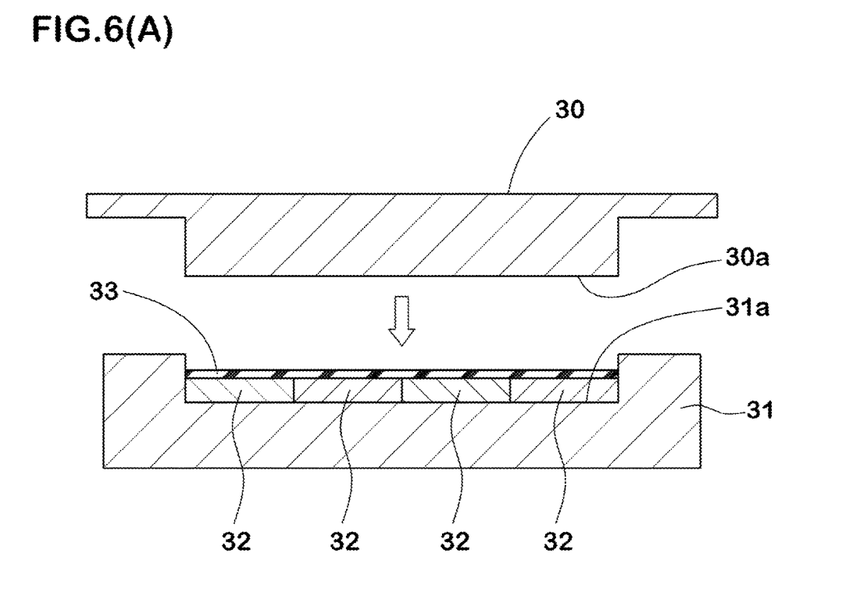

Rubber release property of the coating layer can be evaluated by the peeling test described below. As shown in FIG. 6 (A), upper and lower metallic molds 30 and 31 are used. An upper surface of the lower metallic mold 31 is provided with a concave portion 31$a$ having a depth of about 15 mm. A lower surface of the upper metallic mold 30 is provided with a convex portion 30$a$ to joint with the concave portion 31$a$. A bottom surface of the concave portion 31$a$ is provided with a sample piece 32 having a thickness of about 10 mm with a coating layer on its surface. In this embodiment, a plurality of sample pieces 32 having different types of coatings are disposed. Also on an upper surface of each of the sample pieces 32, an unvulcanized rubber sheet 33 having a thickness of about 2 mm is arranged. And the sample piece 32 and the rubber sheet 33 are sandwiched between the upper and lower metallic molds 30 and 31 and subjected to heat vulcanization while pressuring. Vulcanization conditions, for example, are a temperature of 170 degrees C., time of 12 minutes, pressure of about 22 kg/cm$^2$.

Figure 6B:
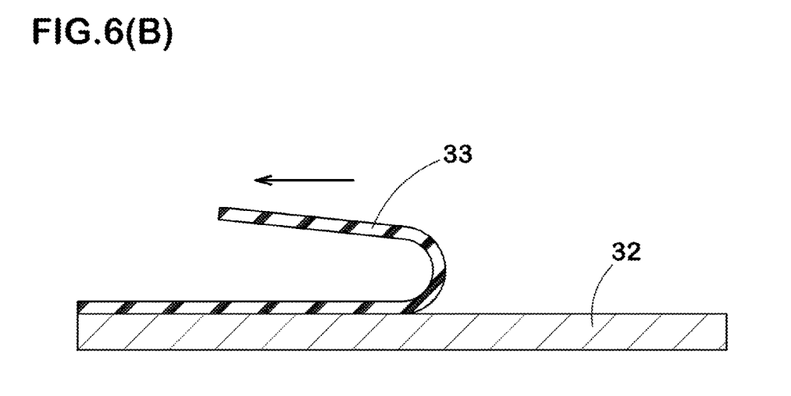

After vulcanization, as shown in FIG. 6 (B), a peeling property when peeling the vulcanized rubber sheet 33 from the sample piece 32 by hand is evaluated by an operator's senses. Note that in the coating layer, an evaluation ranking of peeling property with the rubber after vulcanization and an evaluation ranking of the peeling property with the unvulcanized rubber are approximately same.

Next, a manufacturing method of the tire comprises a green tire forming step and a vulcanizing step. As shown in FIG. 4, in the green tire forming step, tire structure members such as a carcass ply, a belt ply, a sidewall rubber, a tread rubber are sequentially attached on the tire forming surface s of the rigid inner mold 1, thereby forming the green tire T. In the vulcanizing step as shown in FIG. 1, the green tire T obtained in the green tire forming step is put into the vulcanizing metallic mold B with the rigid inner mold 1, and the vulcanization molding is performed.

The above has described in detail a particularly preferred embodiment of the present invention, the present invention is not limited to the embodiments shown, may be employed upon modifying the same into various forms.

EXAMPLE

In order to confirm effects of the present invention, in accordance with specifications shown in Table 1, employing a rigid inner mold provided with a coating layer having a rubber release property of mating surfaces of an inner mold segment and a tire forming surface, a pneumatic tire (245/40R18) was formed. And formability at the time of forming a green tire, an extraction property of inner mold segments from the vulcanized tire, and a durability of the coating layer were tested and evaluated.

Rubber release property and hardness of the coating layer shown in Table 1 are given in Table 2. The rubber release property was evaluated by an operator's senses on a five-point scale. The larger numerical value is excellent in releasing property. Further, the hardness of the coating layer is measured and compared in accordance with JIS Z2244, "Micro Vickers hardness test" described in "Vickers hardness test—Test method".

(1) Green Tire Formability:

When attaching a tape-like unvulcanized rubber strip (having a thickness of 2 mm, a width 15 mm) on a tire molding surface S of the inner mold body to form an inner liner rubber layer of the tire T, an evaluation was made based on the number of times (n) where the rubber strip did not stuck but peeled off from the tire forming surface S. Evaluations were as indicated below:

Note that the above-mentioned number of the times (n) is the number per formation of twenty green tires T.

n=0: 10 points;
n=1 to 2: 9 points;
. . .
n=19 to 20: 0 point.

It should be noted that evaluations were made at an initial term (from 1$^{st}$ to 20$^{th}$ tires), a medium term (from 1001$^{st}$ to 1020$^{th}$ tires), a later term (from 2001$^{st}$ to 2020$^{th}$ tires).

(2) Extraction Operation Property of Inner Mold Segments:

As shown in FIG. 5, when pulled out the inner mold segments radially inward from the vulcanized tire T1 after vulcanization forming, a pull-out force F was measured and evaluated on ten-point scale. The larger number has a smaller pull-out force F and is excellent in the extraction efficiency. It should be noted that evaluations were made at an initial term (from 1$^{st}$ to 20$^{th}$ tires), a medium term (from 1001$^{st}$ to 1020$^{th}$ tires), a later term (from 2001$^{st}$ to 2020$^{th}$ tires).

(4) Durability of Coating Layer

Through a similar procedure to the evaluating method of the extraction operation property of the inner mold segments, the extraction operation property of the inner mold segments was evaluated. In the evaluation, an amount of decrease in extraction property between the initial term and the medium term, and an amount of decrease in extraction property between the initial term and the later term were indexed with consideration for importance (weight) respectively, thereby performing a comprehensive evaluation. It should be noted that the weight for the amount of decrease between the initial term and the medium term is set to larger than the weight for the amount of decrease between the initial term and the later term. The larger numerical value, the better the durability.

TABLE 1

|  | Ref. Ex. 1 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Coating place |  |  |  |  |  |  |  |  |  |  |  |
| Tread molding surface portion S1 | A | B | C | D | E | D | D | D | D | C | B |
| Outer side surface portion S2o | A | B | C | D | E | B | E | B | D | C | B |
| Inner side surface portion S2i | A | B | C | D | E | E | E | B | E | E | E |
| Evaluation points Green tire molding property |  |  |  |  |  |  |  |  |  |  |  |
| Initial term | 10 | 10 | 6 | 6 | 10 | 10 | 10 | 10 | 8 | 8 | 10 |
| Medium term | 10 | 10 | 6 | 6 | 10 | 10 | 10 | 10 | 8 | 8 | 10 |
| Later term | 10 | 10 | 6 | 6 | 10 | 10 | 10 | 10 | 8 | 8 | 10 |
| Extraction property of inner mold segments |  |  |  |  |  |  |  |  |  |  |  |
| Initial term | 4 | 7 | 10 | 10 | 7 | 10 | 10 | 10 | 10 | 10 | 7 |
| Medium term | 3 | 7 | 9 | 7 | 7 | 10 | 10 | 10 | 8 | 9 | 7 |
| Later term | 2 | 6 | 8 | 6 | 7 | 10 | 10 | 9 | 6 | 8 | 6 |
| Durability | — | 68 | 63 | 50 | 92 | 88 | 90 | 66 | 60 | 65 | 70 |

TABLE 2

| Coating layer |  | Rubber release property | Hardness |
|---|---|---|---|
| A | None | 2 | 4 |
| B | Bicoat (NYK-01) | 4 | 4 |
| C | Bicoat (NYK-61) | 5 | 4 |
| D | Bicoat (NYF-11) | 5 | 3 |
| E | Bicoat (NYO-01) | 4 | 5 |

* Bicoat is a composite film of organic material with inorganic material manufactured by YOSHIDA SKT CO., LTD.

As shown in Table 1, in goods of the embodiment, by forming a coating layer having a rubber releasing property, it can be confirmed that the extraction property of the inner mold segments can be improved. Also among the coating layers, aside coating layer portion, particularly an inner side coating layer portion, has large hardness, thereby improving the durability. Therefore, the extraction property of the inner mold segments can be confirmed.

DESCRIPTION OF THE REFERENCE NUMERALS

1 Rigid inner mold
2 Inner mold body
5 Inner mold segment
11 Coati ng layer
11A Tread coating layer portion
11B side coating layer portion
11Bi Inner side coating layer portion
11Bo Outer side coating layer portion
B outer side coating layer portion
S Tire molding surface
S1 Tread molding surface
S2 side molding surface
T Green tire

The invention claimed is:

1. A rigid inner mold for forming a tire, comprising:
an annular inner mold body comprising a plurality of inner mold segments divided in-the circumferential direction and having a tire molding surface configured to form a green tire, the annular inner mold body being configured to be put into a vulcanizing metallic mold with the green tire such that the green tire is vulcanized between the vulcanizing metallic mold and the annular inner mold body,
wherein the annular inner mold body comprises a coating layer formed on the tire molding surface and having rubber release property, and the coating layer comprises a plurality of coating layer portions having different hardness such that the coating layer portions are formed on different portions of the tire molding surface.

2. The rigid inner mold for forming a tire according to claim 1, wherein the tire molding surface comprises a tread molding surface portion configured to mold an inner side surface of a tread portion of a tire, and a side molding surface portion positioned on both sides of the tread molding surface portion, the coating layer comprises a tread coating layer portion formed in the tread molding surface portion, and a side coating layer portion formed in the side molding surface portion, and the side coating layer portion comprises a coating layer portion having hardness which is greater than hardness of a coating layer portion in the tread coating layer portion.

3. The rigid inner mold for forming a tire according to claim 2, wherein the plurality of inner mold segments comprises a plurality of first inner mold segments and a plurality of second inner mold segments formed such that the first and second inner mold segments are mated alternately in the circumferential direction.

4. The rigid inner mold for foil ling a tire according to claim 2, wherein the plurality of inner mold segments comprises a plurality of first inner mold segments and a plurality of second inner mold segments formed such that the first and second inner mold segments are mated alternately in the circumferential direction, the plurality of first inner mold segments is formed such that each of the first inner mold segments has mating surfaces inclined in a direction of a circumferential width increasing radially inward, and the plurality of second inner mold segments is formed such that each of the second inner mold segments has mating surfaces inclined in a direction of a circumferential width decreasing radially inward.

5. The rigid inner mold for forming a tire according to claim 2, wherein each of the coating layer portions comprises a composite film comprising an organic material and an inorganic material.

6. The rigid inner mold for forming a tire according to claim 2, wherein each of the coating layer portions comprises a composite film comprising an organic material and an inorganic material, the organic material is a resin material selected from the group consisting of a fluorine-based resin and a siloxane-based resin, and the inorganic material is selected from the group consisting of a metal material and a ceramic material.

7. The rigid inner mold for forming a tire according to claim 2, wherein the side coating layer portion is divided into an outer side coating layer portion positioned on a radially outer side and an inner side coating layer portion positioned on a radially inner side, and the inner side coating layer portion has hardness which is greater than hardness of the outer side coating layer portion.

8. The rigid inner mold for forming a tire according to claim 7, wherein the plurality of inner mold segments comprises a plurality of first inner mold segments and a plurality of second inner mold segments formed such that the first and second inner mold segments are mated alternately in the circumferential direction.

9. The rigid inner mold for forming a tire according to claim 7, wherein the plurality of inner mold segments comprises a plurality of first inner mold segments and a plurality of second inner mold segments formed such that the first and second inner mold segments are mated alternately in the circumferential direction, the plurality of first inner mold segments is formed such that each of the first inner mold segments has mating surfaces inclined in a direction of a circumferential width increasing radially inward, and the plurality of second inner mold segments is formed such that each of the second inner mold segments has mating surfaces inclined in a direction of a circumferential width decreasing radially inward.

10. The rigid inner mold for forming a tire according to claim 7, wherein each of the coating layer portions comprises a composite film comprising an organic material and an inorganic material.

11. The rigid inner mold for forming a tire according to claim 7, wherein each of the coating layer portions comprises a composite film comprising an organic material and an inorganic material, the organic material is a resin material selected from the group consisting of a fluorine-based resin and a siloxane-based resin, and the inorganic material is selected from the group consisting of a metal material and a ceramic material.

12. The rigid inner mold for forming a tire according to claim 1, wherein the plurality of inner mold segments comprises a plurality of first inner mold segments and a plurality of second inner mold segments formed such that the first and second inner mold segments are mated alternately in the circumferential direction.

13. The rigid inner mold for forming a tire according to claim 1, wherein the plurality of inner mold segments comprises a plurality of first inner mold segments and a plurality of second inner mold segments formed such that the first and second inner mold segments are mated alternately in the circumferential direction, the plurality of first inner mold segments is formed such that each of the first inner mold segments has mating surfaces inclined in a direction of a circumferential width increasing radially inward, and the plurality of second inner mold segments is formed such that each of the second inner mold segments has mating surfaces inclined in a direction of a circumferential width decreasing radially inward.

14. The rigid inner mold for forming a tire according to claim 1, wherein each of the coating layer portions comprises a composite film comprising an organic material and an inorganic material.

15. The rigid inner mold for forming a tire according to claim 1, wherein each of the coating layer portions comprises a composite film comprising an organic material and an inorganic material, the organic material is a resin material selected from the group consisting of a fluorine-based resin and a siloxane-based resin, and the inorganic material is selected from the group consisting of a metal material and a ceramic material.

16. A method of manufacturing a tire, comprising:
attaching sequentially a plurality of tire structure members onto the tire molding surface of the annular inner mold body of the rigid inner mold according to claim 1 such that the green tire is obtained;
putting the green tire into the vulcanizing metallic mold with the rigid inner mold: and
vulcanizing the green tire between the vulcanizing metallic mold and the annular inner mold body.

17. A method of manufacturing a tire, comprising:
attaching sequentially a plurality of tire structure members onto the tire molding surface of the annular inner mold body of the rigid inner mold according to claim 2 such that the green tire is obtained;
putting the green tire into the vulcanizing metallic mold with the rigid inner mold; and
vulcanizing the green tire between the vulcanizing metallic mold and the annular inner mold body.

18. A method of manufacturing a tire, comprising:
attaching sequentially a plurality of tire structure members onto the tire molding surface of the annular inner mold body of the rigid inner mold according to claim 7 such that the green tire is obtained;
putting the green tire into the vulcanizing metallic mold with the rigid inner mold; and
vulcanizing the green tire between the vulcanizing metallic mold and the annular inner mold body.

19. A method of manufacturing a tire, comprising:
attaching sequentially a plurality of tire structure members onto the tire molding surface of the annular inner mold body of the rigid inner mold according to claim 12 such that the green tire is obtained;
putting the green tire into the vulcanizing metallic mold with the rigid inner mold; and
vulcanizing the green tire between the vulcanizing metallic mold and the annular inner mold body.

20. A method of manufacturing a tire, comprising:
attaching sequentially a plurality of tire structure members onto the tire molding surface of the annular inner mold body of the rigid inner mold according to claim 13 such that the green tire is obtained;

putting the green tire into the vulcanizing metallic mold with the rigid inner mold; and vulcanizing the green tire between the vulcanizing metallic mold and the annular inner mold body.

* * * * *